ature the bar will be observed to decrease in frequency when heated, and increase when cooled.

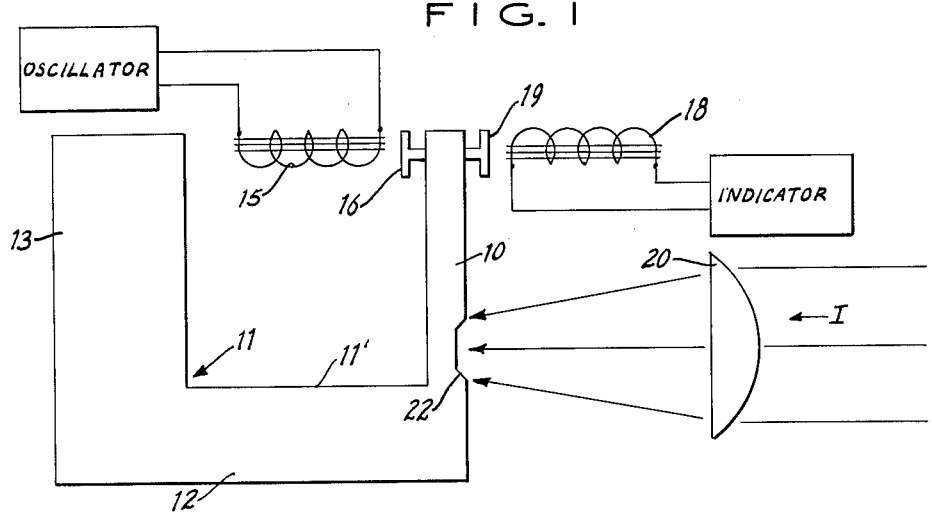
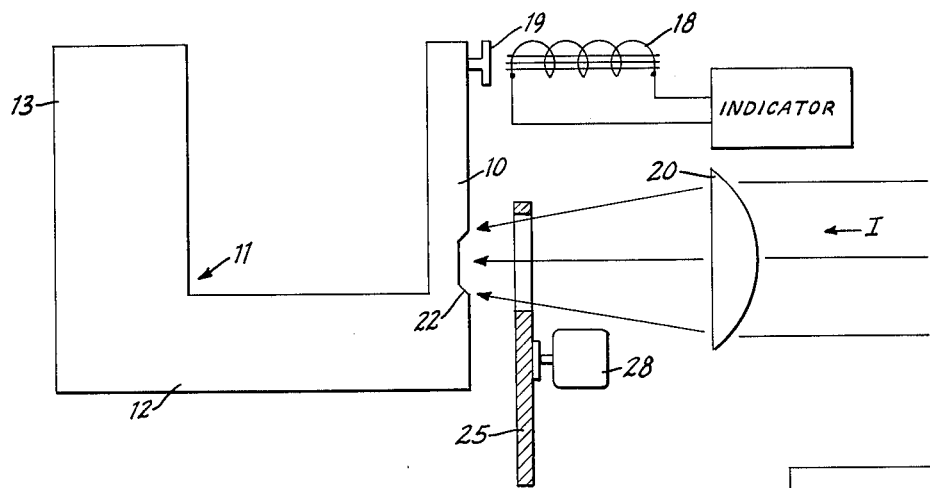
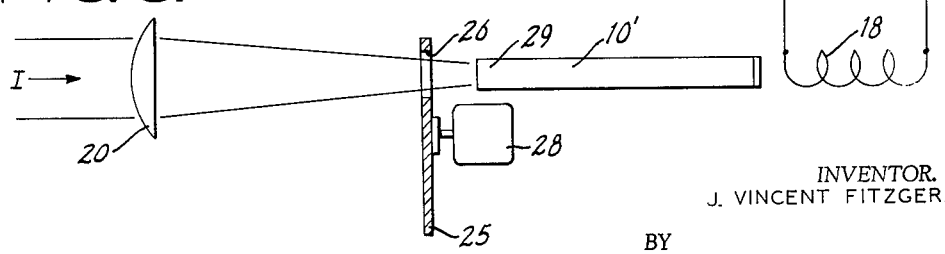

United States Patent Office
3,207,900
Patented Sept. 21, 1965

3,207,900
RADIATION RESPONSIVE DYNAMIC
MECHANICAL SYSTEM
John Vincent Fitzgerald, 106 Morris Ave.,
Metuchen, N.J.
Filed Nov. 29, 1961, Ser. No. 155,785
11 Claims. (Cl. 250—83.3)

This invention relates to radiometers and more particularly to radiometers employing radiation-responsive dynamic mechanical systems.

There are currently available many types of radiometers, each type having its advantages and shortcomings which make it suited for one application but inappropriate for another. Such factors as spectral response, sensitivity, response time, power requirements and size govern the range of application of a particular radiometer.

Although quite varied in specific characteristics, present radiometers of the sensitive type are, by and large, electrical devices in which some electrical quantity such as electron emission, resistance, junction voltage, or conductivity varies in response to incident or secondary radiation. Examples of such devices include photoconductive and photovoltaic cells, thermocouples and thermopiles, and bolometers.

It is an object of the invention to provide a new type of radiometer in which one or more quantities in a dynamic mechanical system is made responsive to incident radiation. Such a system has certain advantages over many present radiometers in the areas mentioned above, including superior sensitivity, greater precision and predictability in spectral response, and shorter response time.

These and other objects and advantages of the invention will be set forth in part hereinafter and in part will be obvious herefrom, or may be learned by practice with the invention, the same being realized and attained by means of the instrumentalities and combinations pointed out in the appended claims.

A solid bar supported at nodal points will ring or resonate at a characteristics frequency when struck. The xylophone which employs a number of such bars is based on this principle. Each metal bar emits a note or distinctive tone (with overtones) determined by its modulus and dimensions. Certain materials such as fused quartz and steel vibrate very sharply. These materials have a high Q which is associated with their very low internal friction. Losses are low in such elements and band pass is narrow. Thus when the amplitude of natural vibration is plotted as a function of imposed vibrational force, a very sharp peak at the resonant frequency is obtained. These effects have been exhaustively studied and there exists a well developed mathematics for calculating natural frequencies and harmonics of vibrating solids of simple shapes.

If a vibratory member such as the bar above is exposed to radiation such as energy in the infra red region, the resonant frequency and vibration amplitude of the member will change. Presumably the shift in resonant frequency can be attributed to changes in modulus and dimensions at the center or region of the bar undergoing the most strain. This strain is brought about by heating (or cooling) induced by the incident (or emitted) infra red radiation.

By providing means for detecting the frequency and/or amplitude change, such a vibrating member becomes a radiometer element capable of detecting the presence of radiation. The invention is directed to such systems.

Serving to illustrate exemplary embodiments of the invention are the drawings, of which:

FIGURE 1 is a schematic and elevation view of a resonance radiometer according to the invention;

FIGURE 2 is a schematic and elevation view of another embodiment which includes radiation modulating means, and FIGURE 3 is a schematic and elevation view illustrating another embodiment of the invention in which the vibratory member is in the longitudinal vibration mode.

The embodiment illustrated in FIGURE 1 utilizes a vibratory member such as a steel bar 10 which forms an element of a structure 11 including a base section 12 and rear section 13. Oscillation of bar 10 at its resonant frequency, $f_r$, and at amplitude, $p$, is provided by drive means illustratively in the form of drive coil 15 and associated ferrite 16, the coil 15 being driven, in turn, from an oscillator.

For detecting the vibratory action of bar 10, pick-up means are provided, conveniently a pick-up coil 18 and ferrite 19. The latter is connected to the bar and induces a voltage in coil 18 which varies in accordance with bar velocity. For sinusoidal oscillation the voltage variation will also be indicative of bar displacement provided phase shift is taken into account.

The output of coil 18 is fed to indicating means which, for demonstration purposes, may be an oscilloscope, direct writing recorder or the like. To prevent cross coupling effects, coil 18 should in the general case be shielded from coil 15 and ferrite 16.

The system of FIGURE 1 is radiation responsive. Thus, infra red energy, I, directed on bar 10 as by lens 20, will produce changes in the vibration frequency and amplitude of the bar, both effects being observable at the indicator. To maximize this response for greatest sensitivity, it is preferable that the energy be concentrated in the region of maximum flexure which in the case of FIGURE 1 is region 22. Sharper definition of this region can be provided by reducing one of the lateral dimensions thereof as indicated in the figure.

Changes in frequency and amplitude of vibration will also result if the incident radiation is outside the infra red region. Ultra violet, gamma, beta and alpha rays will also produce the local heating in region 22 which results in amplitude and frequency changes.

The bar 10 in FIGURE 1 may be considered as a loaded uniform bar in lateral vibration at a frequency, $f_r$, where $$f_r = \frac{1}{4\pi}\sqrt{\frac{Ebd^3}{ml^3}} \qquad (1)$$

and where

E is Young's modulus ($2 \times 10^{12}$ dynes/cm.$^2$).
$b$ is bar width in cm.
$d$ is bar thickness in cm.
$l$ is the length of reduced region 22 in cm.
$m$ is the mass of bar 10 and the ferrites with their supports, the bar being considered that portion which extends above line 11'.

By way of generally checking the performance of the system of FIGURE 1, an experimental model can be constructed in which the following dimensions are observed.

$b = 0.5$ cm.
$d = 0.016$ cm.
$l = 0.5$ cm.
$m = 10$ grams.

Under these conditions, the bar will oscillate at approximately 150 cps. A change in frequency and amplitude will be observed by the convenient expedient of focusing sunlight on region 22 or placing a soldering iron in the vicinity thereof. Since Young's modulus E decreases in an approximately linear fashion as a function of temperature, it is possible to actually determine the new temperature conditions.

By modulating the incident radiation applied to the vibratory member it is possible to dispense with the driving means. At the same time, surprising sensitivity is obtained. Such an arrangement is shown in FIGURE 2 where a modulator or chopper 25 is interposed between the radiation I and the bar 10. The modulator is energized from a driver 28 at the natural frequency of the bar or a submultiple thereof.

Sunlight I focussed on the sensitive region 22 of the detector member 10 does not generate a signal detectable on the indicator, illustratively an audio amplifier and oscilloscope. However, when the chopper 25 interrupts the radiation at the natural frequency of bar 10, the latter vibrates causing an electrical signal to be generated in the pick-up coil 18 which is amplified by the audio amplifier and indicated by the oscilloscope. When radiation, I, becomes more intense or the radiation flux increases, the amplitude of the indicated signal on the oscilloscope becomes larger.

Each pulse of radiant energy when absorbed in the surface layer of the reed 10 in the region or area 22 of maximum strain, causes local heating. Almost immediately, the increase in temperature causes thermal expansion and generates a compressive stress tending to bend the surface of the reed convexly. Between pulses some or most of the heat is conducted away by adjacent laminar regions. The next radiant pulse again heats, or may heat to a higher temperature level, and thereby generates more stress. If the internal friction losses are low this mechanical energy accumulates or is conserved. The reed begins to vibrate with greater and greater amplitude until an equilibrium is reached where the radiant energy absorbed in equal to the internal frictional losses, plus the electrical work done by the ferrite motion near the pick-up coil 18 and all other losses. It may be seen that there is here provided the conversion of radiant energy to vibrational kinetic energy. This latter energy is converted, in turn, into electrical energy. The kinetic energy results from the conservation or build-up of vibrational energy from repeated pulses of radiant energy occurring in synchronism with the natural frequency of the vibrating member. When the incident radiation pulses are out of phase, the amplitude of the vibrating member will be reduced.

By making the member 10 of a transparent glass, the radiation, I, will penetrate according to Beer's law $I = I_0 e^{-kt}$. Therefore, the heating will occur in a volume region instantaneously thus minimizing sluggishness and insensitivity caused by diffusion of heat as is the case with opaque metals.

In practising the invention as embodied in FIGURE 2 a simple model may be constructed as indicated below.

As a radiation source, a projector-type lamp rated at 1,000 watts may be used in conjunction with a condensing lens. Alternatively sunlight focussed by a Fresnel lens may be employed. Reed 10 is of stainless steel, is 2 cm. long, 0.2 cm. wide and 0.03 cm. thick. The sensitive flexure region is reduced to approximately 0.015 cm. in thickness over a length of 0.3 cm. This region is coated with absorption-promoting material such as lamp soot.

The disk 25 is 14 cm. in diameter and has eight equally spaced apertures 26 each 2 cm. in diameter. The disk is driven by a motor 28 which may be a Pittman DC62A PM motor. The motor speed is controlled by a variable transformer such as an Ampak D.C., 0–12 volt type which is energized from the conventional 110 volt source.

A type 1177–B Leach Relay coil near an alnico magnet may be used as the pick-up. For amplifying the output thereof, an H. H. Scott type 99–A preamplifier and amplifier may be used.

Radiation from either of the sources described above is directed to region 22. The chopper frequency is then adjusted by adjusting motor speed until a maximum output is detected on the oscilloscope. In the example this will occur when the chopper frequency is in the region of 20 cps.

In the embodiments illustrated thus far, the vibratory member is mounted and driven for lateral oscillation. The radiometer may, however, utilize a member 10' in the longitudinal vibration mode, with the pick-up at one end and the radiation incident on the other such as shown in FIGURE 3. In this case the resonant frequency $f_r$ is given by $$f_r = \frac{n}{2l}\sqrt{\frac{E}{\rho}}$$

where $n$ is an integer 1, 2, 3, . . .
$l$ is length in cm.
$E$ is Young's modulus
$\rho$ is density When the radiation, I, is modulated by chopper 25 synchronously with the resonant frequency, $f_r$ and is focussed on the end 29, the bar 10' starts to vibrate inducing an emf in the coil 18. When member 10' consists of glass and the $e^{th}$ distance of penetration is approximately equal to the wavelength of the longitudinal vibrations, the vibrational response will become greater.

In selecting a material for the vibrating member certain factors including Q and temperature dependence of E should be considered. Young's modulus E for most solids decreases slowly with temperature. Steel is a typical metal in this regard. On the other hand, steel is usually characterized by a very low internal friction and thus has a very sharp resonance.

With certain solids E increases with temperature—fuzed quartz and lead-silicate glass being examples. Moreover, both of these materials have low internal frictions at room temperature. The persistent ring of a fine cut glass crystal bowl when tapped is illustrative of this property.

Although lacking the precise resonance of fuzed quartz, a soda-lime-silicate glass may be usefully employed as the vibratory element due to the large value of $dE/dT$ characterizing this material in certain ranges. By employing slope detection, the vibration amplitude changes resulting from radiating a soda-lime-silicate member can be readily sensed and indicated.

Those solids—all other things being equal—for which E changes most markedly as a function of temperature ($dE/dT$) will be the more sensitive vibrational radiation detectors. Use can thus be made of materials such as soda-lime-silicate glass which exhibit an anomalous vibrational energy absorption at certain temperature and frequency ranges, where there exists a correspondingly large value of $dE/dT$. These anomalies have been recently demonstrated in several cases to be related to atomic reaction and diffusion phenomena and under these conditions $dE/dT$ is often several times normal.

The mechanical resonance radiometer can be used for remote measurement of temperature, as an infra red horizon sensor, in spectroscopy, as a heat seeker in homing weapons, in thermal photography and in infra red reconnaissance. Its sensitive area or region of maximum vibrational strain can be varied over a wide range. Radiation can be collected, filtered and focused on the sensitive area by any of the many well known techniques in the radiation optics field.

With the resonance radiometer the providing of a heat sink, which is required in many conventional radiometers, is less critical. This is because the surface lamina—or fibers—of the reed, after expanding from heat generated by a radiant heat pulse, immediately dissipate heat to interior lamina and back as well as laterally. Thus the next heat pulse again expands the surface lamina. In a sense the resonant radiometer has an internal heat sink.

The invention in its broader aspects is not limited to the specific mechanisms shown and described but departures may be made therefrom within the scope of the accompanying claims without departing from the principles of the invention and without sacrificing its chief advantages.

What is claimed is:

1. A radiometer comprising a member adapted to vibrate in resonance, means for subjecting said member to electromagnetic radiation, means for causing said members to vibrate, including means for modulating said radiation at a frequency $f_r/n$ where $f_r$ is the resonant frequency and $n$ is an integer other than zero whereby said modulated radiation causes said member to vibrate and pick-up means responsive to the vibration of said member for signalling the presence of said radiation.

2. A radiometer as defined in claim 1 in which said member is a non-conductive element subjected to said radiation in a large flexure region of said member.

3. A radiometer as defined in claim 1 in which said member includes a section of reduced dimension conforming substantially with the maximum flexure region of said member.

4. A radiometer as defined in claim 1 in which said member is at least partially opaque to said radiation for improving the response time of said member.

5. A radiometer as defined in claim 1 in which said pick-up means include means to sense amplitude variations for signalling a change in said radiation.

6. A radiometer as defined in claim 1 in which said member comprises ceramic material having a characteristic modulus, E, which undergoes a maximum rate of change per temperature variation in the operating range.

7. A radiometer comprising an electrically non-conductive member mounted in a stress free condition and adapted to vibrate in resonance, means for subjecting said member to electromagnetic radiation in a large flexure region thereof whereby vibration of said member is altered and pick-up means responsive to the vibration of said member for signalling the presence of said radiation.

8. A radiometer comprising a member mounted in a stress free condition and adapted to vibrate in resonance, means for subjecting said member to electromagnetic radiation whereby vibration of said member is altered, said vibrating member having uniform dimensions except in a large flexure region thereof where one dimension is reduced, said flexure region receiving said electromagnetic radiation, and pick-up means responsive to the vibration of said member for signalling the presence of said radiation.

9. A radiometer comprising an electrically non-conductive member mounted in a stress free condition and adapted to vibrate in resonance, means for subjecting said member to electromagnetic radiation whereby vibration of said member is altered, pick-up means responsive to the vibration of said member and adapted to sense a change in the vibration frequency of said member for signalling a change in the magnitude of said radiation.

10. A radiometer comprising a member mounted in a stress free condition and adapted to vibrate in resonance, means for subjecting said member to electromagnetic radiation whereby vibration of said member is altered, and pick-up means responsive to the vibration of said member for signalling the presence of said radiation, said pick-up means including means to sense amplitude variation for signalling a change in said radiation.

11. A radiometer comprising a member mounted in a stress free condition and adapted to vibrate in resonance, means for subjecting said member to electromagnetic radiation whereby vibration of said member is altered, and pick-up means responsive to the vibration of said member for signalling the presence of said radiation, said pick-up means comprising a magnetic element coupled to said member and a pick-up coil in the operating area of said element.

References Cited by the Examiner

UNITED STATES PATENTS

| | | | |
|---|---|---|---|
| 2,811,649 | 10/57 | Atkins | 250—83.1 |
| 2,861,165 | 11/58 | Aigrain | 250—83.3 |
| 2,862,416 | 12/58 | Doyle | 307—88 |
| 2,954,477 | 9/60 | Pedersen | 250—83.3 |
| 2,957,081 | 10/60 | Chapman | 250—83.3 |
| 3,024,429 | 3/62 | Cavalieri | 331—156 |
| 3,040,262 | 6/62 | Pearson | 307—88 |
| 3,107,530 | 10/63 | Boss | 73—355 |

RALPH G. NILSON, *Primary Examiner.*

JAMES W. LAWRENCE, *Examiner.*